Nov. 2, 1926.

1,605,045

O. MADER

WING OF FLYING MACHINES

Filed April 27, 1925

Inventor:
Otto Mader
by [signature]
atty.

Patented Nov. 2, 1926.

1,605,045

UNITED STATES PATENT OFFICE.

OTTO MADER, OF DESSAU, GERMANY, ASSIGNOR TO HUGO JUNKERS, OF DESSAU, GERMANY.

WING OF FLYING MACHINES.

Application filed April 27, 1925, Serial No. 26,282, and in Germany April 3, 1924.

My invention refers to the wings or bearing planes of flying machines and more especially to wings capable of being subdivided into several parts or to be detached from the fuselage with a view to facilitating the transport of the craft. It is an object of the present invention to provide a flying machine the wings of which are made in several parts adapted to be assembled together, the form, configuration and general arrangement of the parts being such that the area of the total supporting surface of the craft can be changed within wide limits.

To this end I construct each wing of a flying machine as a distinct member detachable from a middle portion which may or may not be a fuselage or the like or I make it in two or more parts adapted to be assembled together along lines preferably extending substantially in parallel to the longitudinal axis of the flying machine and I provide intermediate sections which can be inserted between two parts of a wing or between a wing and another part, for instance the hull, these intermediate sections being exchangeable and replaceable by smaller or larger sections and loads such as for instance propelling engines being mounted on these sections so that by inserting such sections between the parts of the wing either the engine mounted on the middle portion or the hull respectively of the craft can be replaced by the engines mounted on the sections inserted in the wings or else these engines can be made to cooperate with the engine of the hull.

Preferably these intermediate sections are kept comparatively narrow in order to allow an easy handling.

By so designing the intermediate sections that they are fit to carry loads such as engines, oil or fuel tanks and the like, I succeed in preventing an increase in the bending stress acting on the root of the wing in consequence of the air pressure being increased in proportion to the increase of wing area.

Obviously, these intermediate sections can be handled and transported separately from the large lateral wing portions, whereby the manufacture, the assembling, dismantling and reassembling of the craft is greatly facilitated as compared with the flying machines hitherto used which are provided with a plurality of engines disposed at distant points.

I preferably distribute the loads in such manner that the addition or removal of the intermediate sections does not in any way influence the longitudinal stability of the craft. If it is for instance desired that the distribution of load on the craft remain the same, whether or not the intermediate sections be inserted, I arrange the loads in these sections in such manner that the centre of gravity of the intermediate sections as far as possible coincides with the transversal plane extending through the centre of gravity of the flying machine as a whole. On the other hand, when inserting load carrying intermediate sections, I can also vary the weight or position or both of the load carried on the other parts of the craft in such manner that the conditions of stability remain unchanged. It is thus possible to vary the propelling power within wide limits without in any way changing the construction of the craft, for instance by inserting or removing an engine carrying section in the wings or replacing such section by another section carrying a more or less powerful engine or a different number of engines. I may also replace a section carrying an engine and tractor propeller by another section carrying an engine and pusher propeller and vice versa.

The forces acting on the craft in landing, if the intermediate sections are heavily loaded, can be rendered innocuous by taking up these forces as directly as possible, by mounting the starting and landing gear (carriage, float or the like) either on the exchangeable sections or in close vicinity thereof.

In the drawings affixed to this specification and forming part thereof a flying machine embodying my invention is illustrated diagrammatically by way of example.

In the drawings

Figure 1:
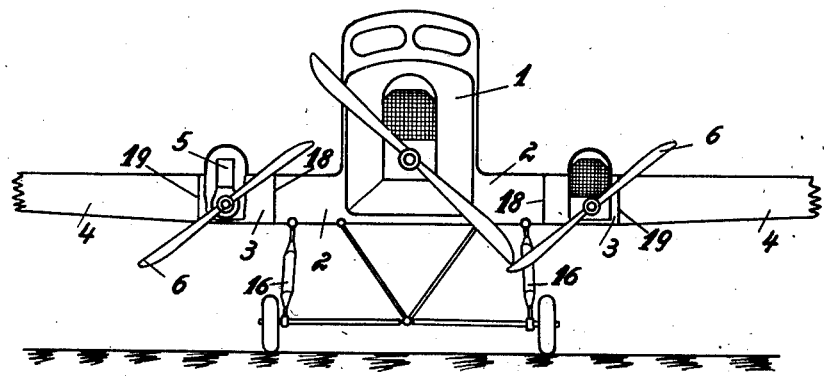
Fig. 1 is an end elevation.
Figure 2:
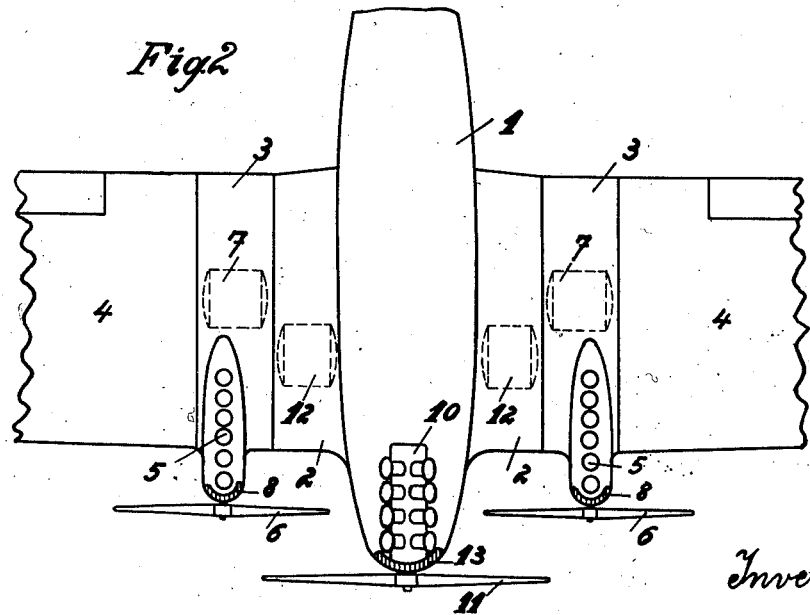
Fig. 2 is a plan view, part of the hull and the lateral wing portions being cut away.

Referring to the drawings, 1 is the hull and 2, 2 are narrow stumps or wing bases formed in one piece with the hull or rigidly and permanently connected with it. 3, 3 are the narrow intermediate sections. 5 is an engine, 6 a propeller, 7 a fuel or oil tank and 8 a cooler mounted on each section. 4, 4 are the lateral wing portions. The intermediate sections 3 are connected with the stumps 2 and the lateral portions 4 in an easily detachable manner and the joints 18, 19 between these parts as well as the means for connecting the parts are identical on either side of each section, thereby enabling the lateral portions 4 of the wings to be directly mounted on the stumps 2. 10 is the main engine, 11 the propeller, 12 the fuel or oil tanks and 13 the cooler mounted on the hull and the stumps, respectively.

Although I have shown in the drawing only a single section inserted on each side of the hull, I wish it to be understood that I may as well subdivide each wing in more than one place and insert two or more identical or different intermediate sections in each wing.

The carriage 17 which is shown to be mounted below the hull is braced against the stumps 2 by means of resilient struts 16. 16, the upper ends of which are connected to the wings in close proximity to the joints 18, whereby the forces arising in the landing of the craft and resulting from the weight of the loads mounted on the intermediate sections are taken up almost directly.

I wish it to be understood that I do not desire to be limited to the particular type of flying machine shown and described, the invention being applicable also to multiplane machines, to hydro-aeroplanes and all other types, more especially also to machines having the hull suspended below the wing. I further do not wish to be limited to the exact details of construction shown and described, for obvious modifications will occur to a person skilled in the art.

I claim:—

1. Flying machine comprising a middle portion, a lateral wing portion on each side and narrow load carrying intermediate sections removably inserted between these parts.

2. Flying machine comprising a middle wing portion, a lateral wing portion on each side and narrow load carrying intermediate sections removably inserted between these parts.

3. Flying machine comprising a middle portion, a self supporting lateral wing portion on each side and narrow load carrying self supporting intermediate sections removably inserted between these parts.

4. Flying machine comprising a middle portion, a lateral wing portion on each side, a narrow load carrying intermediate section removably and exchangeably inserted between said middle portion and each lateral portion and an engine on each intermediate section.

5. Flying machine comprising a middle portion, a lateral wing portion on each side, narrow load carrying intermediate sections removably and exchangeably inserted between said middle portion and said lateral portions and an engine on each intermediate section and on said middle portion.

6. Flying machine comprising a hull, a middle portion on said hull, a lateral wing portion on each side of said middle portion, narrow load carrying intermediate sections removably and exchangeably inserted between the several portions and an engine and a fuel tank on each section.

7. Flying machine comprising a hull, a middle portion on said hull, a lateral wing portion on each side of said middle portion, narrow load carrying intermediate sections removably and exchangeably inserted between the several wing portions and an engine and a fuel tank on each section and on said hull.

8. Flying machine comprising a middle portion, a lateral wing portion on each side, narrow intermediate sections removably and exchangeably inserted between the parts and loads on each intermediate section, the distribution of loads supported by said wing portions and sections being such that the sections can be removed without substantially influencing the longitudinal stability of the craft.

9. Flying machine comprising a hull, stump wings permanently fixed to said hull, a narrow load carrying intermediate section removably attached to each stump wing and a lateral wing portion removably attached to each section.

10. Flying machine comprising a middle wing portion, a narrow load carrying intermediate section removably attached on each side of said middle wing portion, a lateral wing portion removably attached to each section, starting gear below said middle portion and means for bracing said starting gear against said middle portion near said sections.

11. Flying machine comprising a hull, stump wings permanently fixed to said hull, a narrow load carrying intermediate section removably attached to each stump wing, a lateral wing portion removably attached to each section, starting gear below said hull and resilient means for bracing said starting gear against said stump wings.

In testimony whereof I affix my signature.

OTTO MADER.